United States Patent
Calvin

[15] 3,663,367
[45] May 16, 1972

[54] FLOW DEFLECTOR FOR NUCLEAR FUEL ELEMENT ASSEMBLIES

[72] Inventor: John N. Calvin, West Simsbury, Conn.
[73] Assignee: Combustion Engineering, Inc., Windsor, Conn.
[22] Filed: Dec. 31, 1969
[21] Appl. No.: 889,548

[52] U.S. Cl. ..................................................... 176/78
[51] Int. Cl. ......................................................... G21c 3/34
[58] Field of Search .............................................. 176/76, 78

[56] References Cited

UNITED STATES PATENTS

| | | | |
|---|---|---|---|
| 3,298,922 | 1/1967 | Prince et al. | 176/78 |
| 3,301,764 | 1/1967 | Timbs et al. | 176/78 |
| 3,344,855 | 10/1967 | Clark | 176/78 X |
| 3,350,275 | 10/1967 | Venier et al. | 176/76 X |
| 3,356,587 | 12/1967 | Heck | 176/78 |
| 3,379,618 | 4/1968 | Frisch | 176/78 |
| 3,439,737 | 4/1969 | Boorman et al. | 176/78 X |
| 3,510,397 | 5/1970 | Zettervall | 176/78 |

Primary Examiner—Leland A. Sebastian
Assistant Examiner—Gary G. Solyst
Attorney—Carlton F. Bryant, Eldon H. Luther, Robert L. Olson, John F. Carney, Richard H. Berneike, Edward L. Kochey, Jr. and Lawrence P. Kessler

[57] ABSTRACT

A nuclear reactor fuel element assembly containing a plurality of spaced parallel fuel elements is provided with inverted conical or pyramidal deflector elements in the coolant flow channels between the fuel elements to divert the coolant flow. This disrupts the coolant layer adjacent to the fuel elements, promotes the mixing of coolant from various channels and raises the critical heat flux. The deflector elements are supported in position at the points of intersection of a grid structure which may also be a support grid for the fuel elements.

9 Claims, 14 Drawing Figures

Patented May 16, 1972  3,663,367

INVENTOR
JOHN N. CALVIN
BY Richard H. Bernike
ATTORNEY

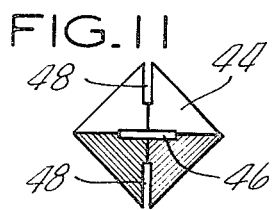
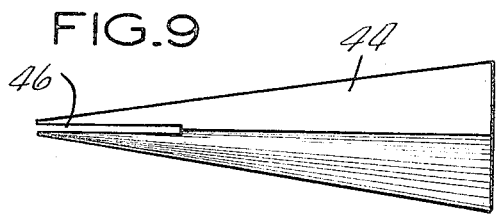
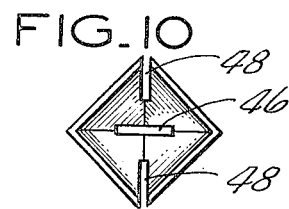
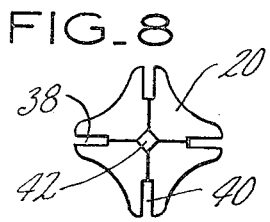
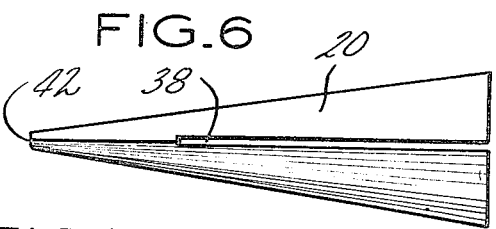
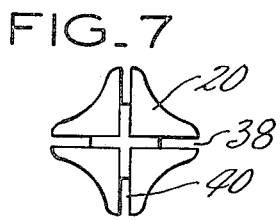
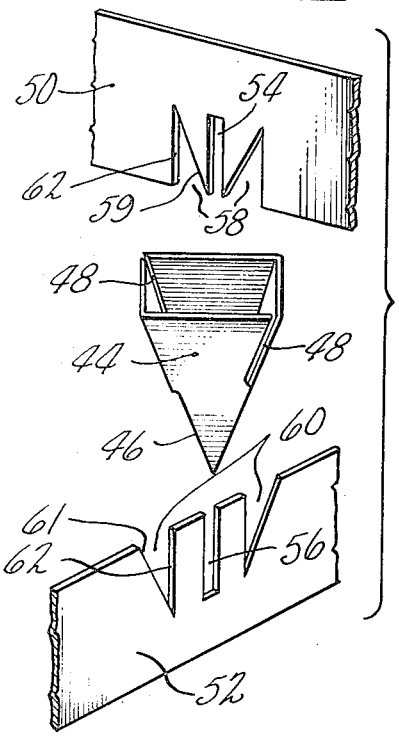
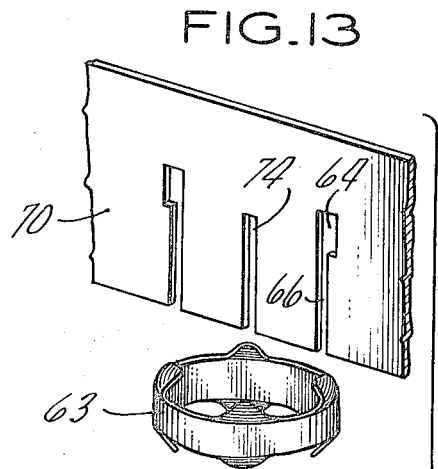
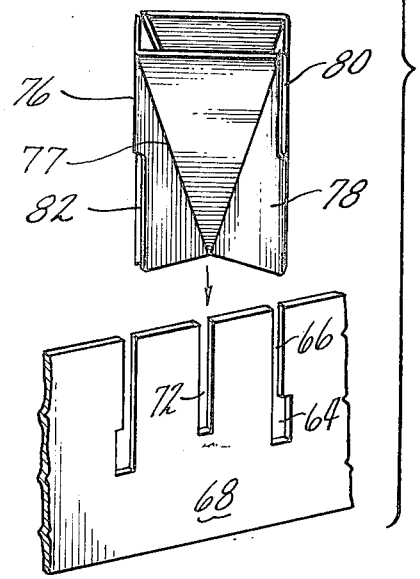
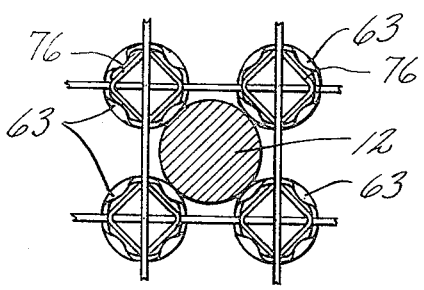
INVENTOR
JOHN N. CALVIN
BY Richard H. Berneike
ATTORNEY 3,663,367

FLOW DEFLECTOR FOR NUCLEAR FUEL ELEMENT ASSEMBLIES

BACKGROUND OF THE INVENTION

It is well known that the fuel or fissionable material for heterogeneous nuclear reactors is conventionally in the form of fuel elements or rods which are in turn grouped together in the reactors in bundles comprising fuel element assemblies. Each reactor has a number of such fuel element assemblies therein comprising the reactor core. The liquid moderator-coolant, normally water, flows upwardly through the reactor core in the channels between the fuel elements to remove heat.

One of the operating limitations on current reactors is established by the onset of film boiling on the surfaces of the fuel elements. This phenomenon is commonly described qualitatively as departure from nucleate boiling (DNB) and quantitatively in terms of the amount of heat flux existing when DNB occurs (critical heat flux or CHF). This condition is affected by the fuel element spacing, the system pressure, the heat flux, the coolant enthalpy and the coolant velocity. When DNB occurs, there is a rapid rise in the temperature of the adjacent fuel element due to the reduced heat transfer which could result in a failure of the element. Therefore, in order to maintain a factor of safety, the reactor must be operated a certain margin below the CHF and the point at which DNB occurs. This margin is referred to as the "thermal margin."

Nuclear reactors normally have regions in the core which have a higher neutron flux and power density than other regions. This may be caused by a number of factors, one of which is the presence of control rod channels in the core. When the control rods are withdrawn, the control rod channels are filled with moderator which increases the local moderating capacity and thereby increases the power generated in the adjacent fuel. In these regions of high power density, known as "hot channels," there is a higher rate of coolant enthalpy rise than in other channels. It is such hot channels that set the maximum operating conditions for the reactor and limit the amount of power that can be generated since it is in these channels that the critical thermal margin would be reached first.

SUMMARY OF THE INVENTION

It has been found that coolant flow inclined to the fuel elements will result in a higher value for the critical heat flux probably because such flow inhibits the formation of steam bubbles and superheated water layers which are found to exist over the fuel element surface just prior to DNB in the presence of parallel flow. It has also been found that mixing vanes or flow deflectors placed in the coolant flow channels of a reactor core will mix coolant from various channels and thus tend to reduce the effect of hot channels. The mixing lowers the high coolant enthalpy rise in the hot channels and tends to average out the enthalpy rise over the core cross section. Both effects mean that the reactor can be operated at a higher power level and still maintain a safe thermal margin.

It is therefore an object of the present invention to provide novel coolant flow deflectors in the reactor core.

Another object of the invention is to provide flow deflectors which will effectively cause disturbance of the coolant flow adjacent the surfaces of the fuel elements as well as cause mixing of the coolant from various channels.

A further object is to provide flow deflectors of a novel design which are supported in the core in a novel manner.

Briefly, the objects of the invention are accomplished by providing a coolant flow deflector in one or more of the spaces between adjacent fuel elements. More specifically, the deflectors are generally of a conical or pyramidal shape and are supported such that flow will be diverted from the centers of the flow channels up against or towards the adjacent fuel elements. Even more specifically, the flow deflectors are supported in the intersections of a grid which may also serve as a support grid for the fuel elements.

BRIEF DESCRIPTION OF THE DRAWINGS

FIGS. 6, 7 and 8 are side, top and bottom views, respectively, of a solid deflector.
FIGS. 9, 10 and 11 are side, top and bottom views, respectively, of a hollow deflector.
FIG. 12 is an exploded view illustrating the assembly technique for the deflector of FIGS. 9, 10 and 11.
FIG. 13 is an exploded view illustrating the assembly technique for a modified deflector and a fuel element spacer ring.
FIG. 14 is a cross-section view illustrating the deflector and spacer of FIG. 13 in relation to the fuel elements.

DESCRIPTION OF THE PREFERRED EMBODIMENTS

Figure 1:
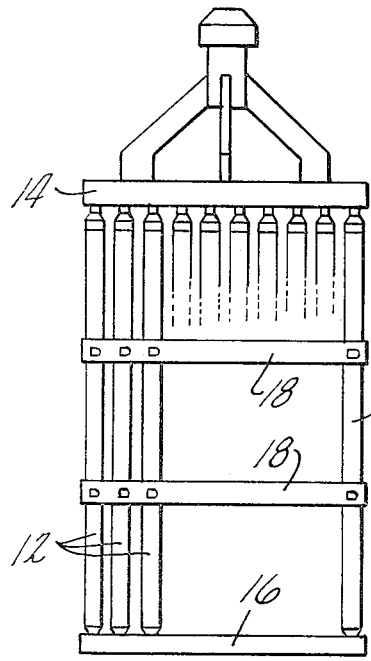
FIG. 1 is an elevation view of a fuel assembly.

FIG. 1 illustrates a fuel element assembly 10 containing individual fuel elements 12 held in place by end fittings 14 and 16 and spacer grids 18. The core of a nuclear reactor is formed from a plurality of such fuel assemblies and it is in such assemblies that the coolant flow deflectors of the present invention are incorporated. The reactor coolant, which is normally water, flows up through apertures in the lower end fitting 16 and upwardly parallel with the fuel elements and out through the upper end fitting 14. It is this upward coolant flow through the fuel assemblies which is affected by the deflectors.

Figure 2:
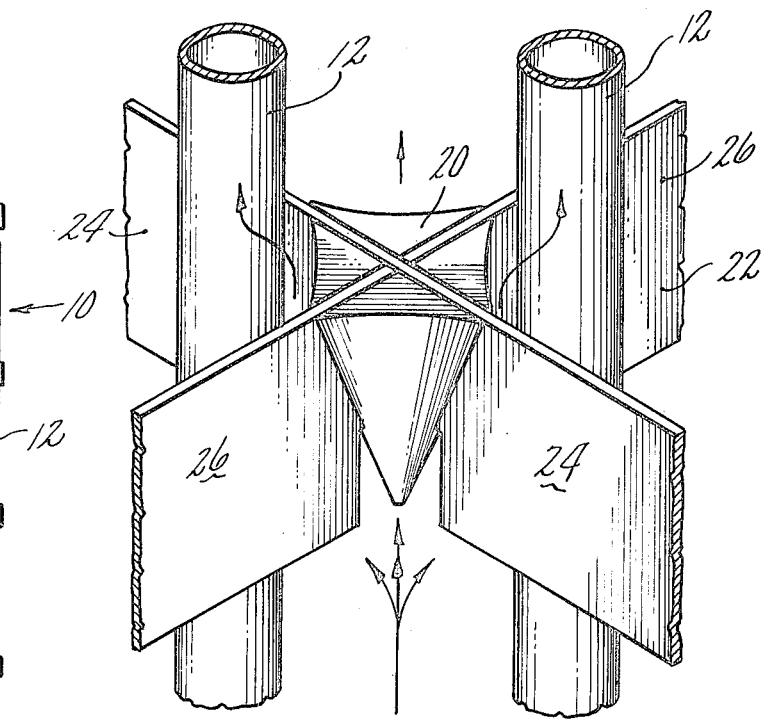
FIG. 2 is a perspective view of a portion of a fuel element assembly illustrating the present invention.
Figure 3:
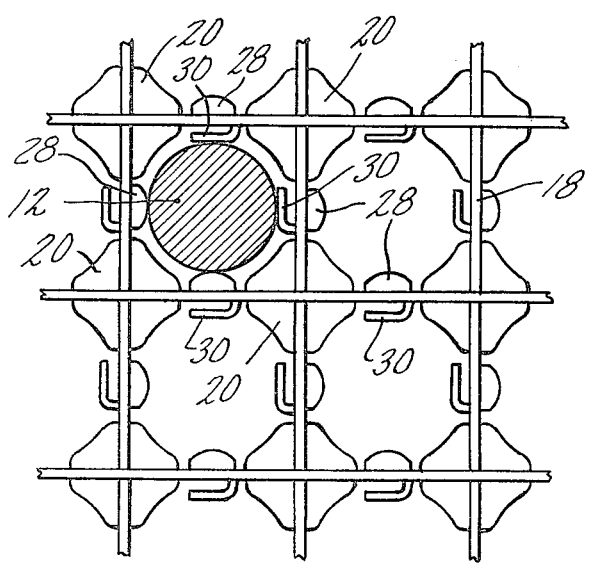
FIG. 3 is a section view through a fuel assembly looking downwardly towards a spacer grid.

The coolant flow deflectors are mounted on grid support structures located at intervals along the length of the fuel assemblies. These grids may be for the sole purpose of supporting the deflectors as shown in FIG. 2 or they may be for the additional purpose of spacing and holding the fuel elements as shown in FIG. 3. FIG. 2 illustrates two fuel elements 12 and a deflector 20 mounted on a grid structure 22 which is formed of members 24 and 26. The deflector 20 is generally pyramidal and deflects the coolant flow from the center of the flow channel between four fuel elements outwardly towards the fuel elements as indicated by the arrows. This flow deflection has two primary effects. First, the flow deflection disrupts the coolant flow conditions immediately adjacent the surface of the individual fuel elements. This tends to eliminate any DNB condition. There is a gradual change from nucleate to stable film boiling rather than a step change. The critical heat flux is increased and it is even difficult to detect the critical point due to the gradual change in boiling characteristics. Second, the flow deflection tends to cause the coolant flowing upwardly in any particular flow channel between the fuel elements to be mixed with the coolant flow in adjacent and even more remote channels. This has the effect of evening out differences in coolant temperature between various channels.

FIG. 3 illustrates the invention applied to a fuel element spacer grid 18, and it is a cross-section view looking downwardly on one of such grids. The grid has projections 28 and springs 30 formed in each grid compartment for engaging and supporting the fuel elements 12, only one of which is illustrated. Of course, the illustrated spacer grid is only one of many types to which the deflectors of the present invention could be applied.

Figure 4:
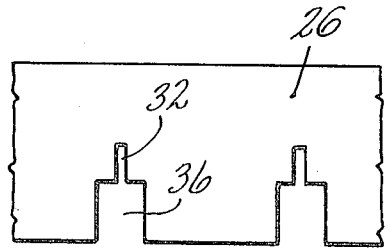
FIGS. 4 and 5 illustrate portions of grid-forming members.
Figure 5:
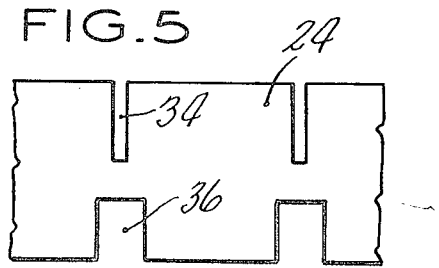

The grid-forming straps 24 and 26 are illustrated in more detail in FIGS. 4 and 5. They are slotted at 32 and 34, respectively, and these slots fit together in "egg crate" fashion to form the grid. The cut-outs 36 are to accept the lower ends of the deflector 20 as shown in FIG. 2.

The deflectors may be of any desired tapered shape which will be defined herein as conical. Although the deflectors could be for example a right cylindrical cone, the preferred conical shape is the generally pyramidal shape shown in the drawings. The pyramid deflector 20 shown in FIGS. 6, 7 and 8 is of solid construction with slots 38 and 40 into which the grid-forming members 4 and 5 fit. The lower end 42 of the deflector need not come to a sharp point and is truncated. The deflector has slightly concave side faces as shown in FIGS. 2, 3, 7 and 8 so as to make the annular space between the deflectors 20 and the fuel elements 12 relatively constant as shown in FIG. 3. This is accomplished by having the center of the radius of curvature of the concavity correspond to the center of the adjacent fuel element. The deflectors are welded to the grid-forming members to hold them in position.

FIGS. 9, 10 and 11 illustrate a modified form of deflector 44 which is also pyramidal in shape but which is formed of sheet metal rather than being solid. This deflector has a slot 46 in the lower end for accepting one of the grid-forming members and another slot 48 in the upper end for accepting the other grid-forming member. This deflector 44 has been illustrated with flat side faces but they could also be concave as in the deflector in FIGS. 6, 7 and 8. FIG. 12 illustrates the configuration of the grid-forming members 50 and 52 which are used in conjunction with the deflectors 44. These grid-forming members have slots 54 and 56 for assembling the two members together and cut-outs 58 and 60 which conform to the contour of the deflector 44 and permit assembly. The edges of the cut-outs 58 identified as 59 fit against the inside of the deflector in the pointed end while the edges 61 of the cut-outs 60 conform to the outside of the deflector adjacent the base or upper end. The straight edges 62 of the cut-outs permit the grid-forming members to be inserted into the deflector slots 46 and 48. The deflector is then trapped between the grid-forming members and welding or other forms of attachment need not be depended upon to keep the deflector in place.

FIGS. 13 and 14 illustrate a further modification of the present invention in which the deflector and grid-forming members are designed so as to provide for the inclusion of a fuel element spacer and support ring 63. This ring fits into the enlarged cut-out portion 64 in the slots 66 in the grid-forming members 68 and 70 and act as a spring member to support the fuel elements 12 as illustrated in FIG. 14. The grid-forming members 68 and 70 include slots 72 and 74 for assembling them in "egg crate" fashion. The pyramidal deflector 76 has edges 77 at the juncture between adjacent side walls. A portion 78 of each side wall at the juncture extends outwardly parallel to and spaced from the adjacent outwardly extending portion. This forms a space between the two parallel portions into which the grid-forming members fit. The grid-forming member 70 fits down into slots 80 in the upper ends of two opposite extending portions while the grid-forming member 68 fits upwardly into the slots 82 in the lower ends of the other two extending portions 78. This design has the added feature that the spacer ring can be formed of a different material than that of the grid-forming members and deflectors. This means that this ring 63 can be made of a material such as Inconel which will retain its spring characteristics satisfactorily during reactor operation while the grid-forming members and deflectors can be formed from a material such as Zircaloy which has a lower neutron absorption cross section and which will tend to lose some spring when subjected to radiation.

While several embodiments of the invention have been shown and described, it will be understood that such is merely illustrative and that changes may be made without departing from the scope of the invention as claimed.

I claim:

1. A nuclear reactor fuel assembly comprising a plurality of longitudinally extending parallel fuel elements arranged in a spaced array forming longitudinal coolant flow channels therebetween, a plurality of deflector cones located in said flow channels between said fuel elements, said deflector cones each including an apex and a base and deflecting surfaces, said apex being located upstream and said base being located downstream with respect to the direction of said coolant flow, and means supporting said deflector cones in position.

2. A nuclear reactor fuel assembly as recited in claim 1 wherein said deflecting surfaces are oriented so as to deflect said coolant flow outwardly in said coolant channels generally towards adjacent fuel elements.

3. A nuclear reactor fuel assembly as recited in claim 1 wherein said deflector cones are each generally pyramidal in shape having a square base and four deflecting side wall surfaces, said side wall surfaces being oriented so as to face four adjacent fuel elements.

4. A nuclear reactor fuel assembly as recited in claim 3 wherein said side wall surfaces are concave and wherein the center of curvature of said concavity generally corresponds to the center of said adjacent fuel element whereby an intermittent annular space is formed between each fuel element and the adjacent deflector cones.

5. A nuclear reactor fuel assembly as recited in claim 1 wherein said means supporting said deflector cones comprises a grid formed from a plurality of cross-laced interengaging straps, said cones being attached to said grid at the intersections of said straps.

6. A nuclear reactor fuel assembly as recited in claim 5 wherein said grid includes means for engaging and supporting said fuel elements.

7. A nuclear reactor fuel assembly as recited in claim 5 wherein each of said deflector cones includes a slot in one end thereof extending from one corner to the opposite corner and a slot in the opposite end thereof extending between the other two corners and wherein a first strap extending in one direction passes through one slot and a strap extending perpendicularly to said first strap passes through the other slot whereby said deflector cone is trapped between said straps.

8. A nuclear reactor fuel assembly comprising a plurality of longitudinally extending parallel fuel elements arranged in a plurality of intersecting rows and forming longitudinal coolant flow channels therebetween, a grid structure formed from a plurality of cross-laced interengaging straps, said straps interposed between adjacent rows of said fuel elements forming fuel element compartments, a plurality of generally pyramidal deflector cones located in said coolant flow channels and mounted on said grid structure at the intersection of said straps, said deflector cones having square bases located downstream with respect to the direction of coolant flow and apexes located upstream, and a plurality of fuel element support rings surrounding said deflector cones, said rings extending into said fuel element compartments so as to engage and support said fuel elements.

9. A nuclear reactor fuel assembly as recited in claim 8 wherein said deflector cones each have four deflecting side walls each oriented so as to face an adjacent fuel element, said deflector cones each being formed from sheet metal and wherein the portions of each side wall at the juncture of said side walls extend outwardly parallel to and spaced from the adjacent outwardly extending side wall portion, said adjacent outwardly extending portions terminating and joined together in a line extending vertically from the corners of said base, slots formed in said portions where joined together, said slots being formed only partially through two opposite portions from said base end and only partially through the other two opposite portions from said apex end, said cross-laced interengaging straps containing vertical slots which are interengaged with said slots in said portions from opposite ends of said deflector cone whereby said deflector cone is held between said straps, said vertical slots further including cut-outs in which said support rings are positioned around said deflector cones.

* * * * *